Figure 2:
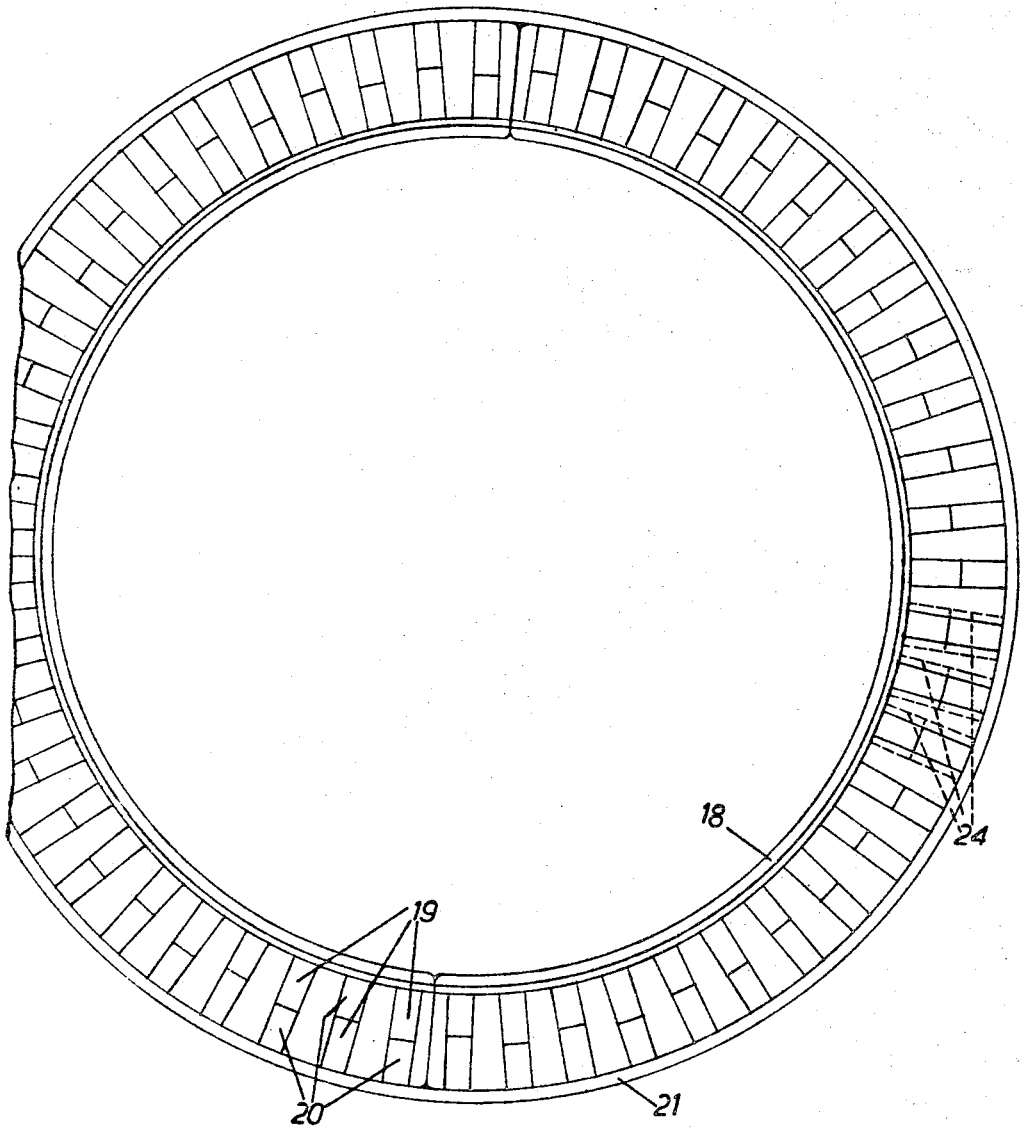

April 30, 1968     M. H. OSMOND     3,380,790
ROLLER BEARINGS ESPECIALLY FOR AIRCRAFT PROPELLER BLADES
Filed Aug. 6, 1965     2 Sheets-Sheet 1
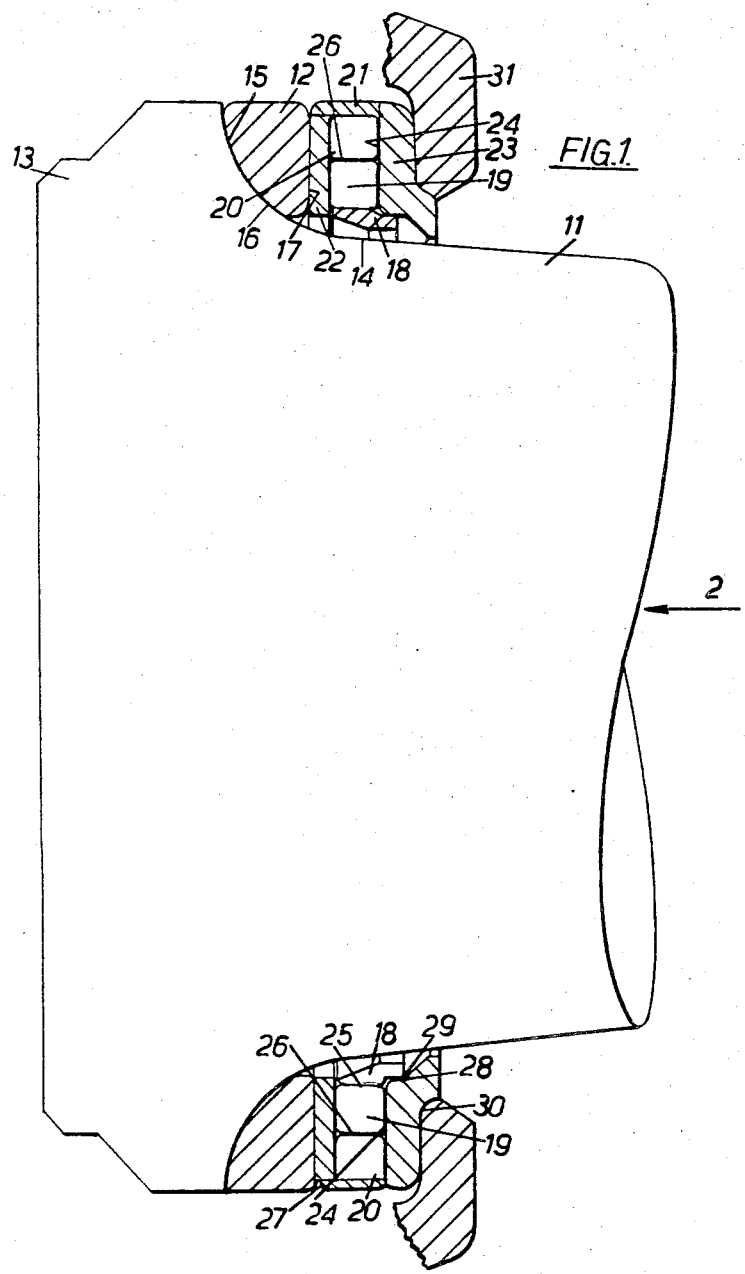
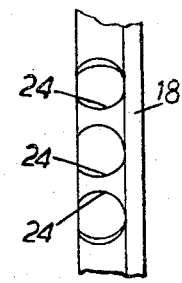

3,380,790
ROLLER BEARINGS ESPECIALLY FOR AIRCRAFT
PROPELLER BLADES
Michael Hugh Osmond, Hatfield, England, assignor to Hawker Siddeley Dynamics Limited, Hatfield, England
Filed Aug. 6, 1965, Ser. No. 477,879
Claims priority, application Great Britain, Aug. 7, 1964, 32,292/64
6 Claims. (Cl. 308—234)

This invention relates to roller bearings, and more particularly to bearings for aircraft propeller blades.

In a normal aircraft propeller each blade is capable of rotation about a pitch change axis which is normal to the blade root and radial with respect to the principal axis of rotation of the propeller, in order that the pitch of the blades can be changed. For this purpose the shank of each blade which enters the central boss of the propeller is rotatable in said boss and a suitable bearing must be provided. The loads on this bearing are considerable but it must still have reasonably low friction so that the pitch-adjusting mechanism can readily turn the blade. And the design problem is aggravated by the fact that the portion of the blade shank next to the blade root, where the bearing has to be fitted, should not be made of cylindrical configuration, necessitating a step change in cross-section, but should increase fairly gradually in cross-section from the shank to the blade.

It is therefore an object of the invention to provide an improved roller bearing assembly which is particularly adapted for use as a propeller blade bearing.

According to the present invention, in a roller bearing to take axial thrust the roller cage for the bearing is formed of a solid ring having a width in the axial direction somewhat less than the roller diameter, which ring is bored radially with a large number of bores closely set around its circumference of a size to receive the rollers and breaking through the radial side faces of the ring, the bores extending in from the periphery of the ring but not so far as to break through the inner circumferential wall thereof, and a retaining hoop is fitted, when the rollers are in place, to encircle the cage and retain the rollers in the bores.

This arrangement enables more rollers to be packed in the bearing cage than has hitherto been possible; in fact there can be substantially as many rollers as could be packed into the same annular volume if the cage were not present. The cage may be diametrically split for ease of assembly and dismantling.

In view of the fact that, as already mentioned, the blade shank receiving the bearing is not cylindrical, and an abrupt change in cross section at the blade root cannot be tolerated, a thrust face for the bearing is often obtained by securing on the shank close up to the blade root an inner thrust race that has an inside surface formed to match the shape of the portion of the shank where it is to seat, the thrust race further providing a flat radial face to sustain the bearing thrust. It may be advantageous in this case to leave slightly more blade shank metal than is actually necessary at the blade root so as to achieve a smoothly curved or radiused configuration on which the thrust race can be readily shaped to seat. However, such an inner thrust race has to be placed in position before the forming and machining of the blade, and also heat treatment thereof, are concluded. The result is that it is not a practical matter to remove such a thrust race after manufacture so that if a defect appears in the thrust race during use, the whole blade has to be scrapped.

According to a preferred feature of the invention, a diametrically split thrust washer is interposed between the thrust face of the inner thrust race and the bearing rollers. Thus if undue wear, spalling or the like of the thrust surface on which the rollers bear takes place the split washer providing said face can be readily renewed. And since the thrust member is now renewable it can be made of cheaper metal providing it is good bearing metal. Preferably, the two halves of the thrust washer are held together by being encircled by an axial extension of the roller-retaining hoop.

The above and other features will be apparent in the following description of one embodiment of the invention, given by way of example and with reference to the accompanying drawings, in which:

FIGURE 1 is an axial section through a propeller blade bearing according to the invention, FIGURE 2 is a view of the roller cage of the bearing looking in the direction of the arrow 2 of FIG. 1 and FIGURE 3 is a detail view looking on the circumferential edge of the roller cage.

To receive the bearing thrust the propeller blade shank 11 shown in the drawing has secured thereon an inner thrust race 12. This thrust race is placed on the shank at the root of the blade at an intermediate stage during manufacture of the blade and becomes, in effect, an integral part of the blade. Since after receiving the inner thrust race 12 the blade undergoes an upsetting operation, following which it has to be heat-treated, the thrust race must be of metal that will stand up to the heat treatment, such as a tool steel.

Since the junction of the propeller blade shank 11 and the blade root 13 cannot be a plain shoulder, an abrupt change of cross-section at this point not being permissible, the inner thrust race 12 has to be shaped to fit a flaring surface. It is therefore preferred to leave rather more shank metal than is otherwise necessary at the blade root in order to obtain a smooth flare 14 meeting the blade root in a radius curve 15, the inside of the thrust race then being readily matched to the same radius curve, as at 16.

On the side away from the blade root 13 the thrust race 12 presents a flat radial face 17 to take the bearing thrust. The bearing comprises essentially a roller cage 18 housing the rollers 19, 20, a roller-retaining hoop 21, a thrust washer 22 and an outer thrust race 23.

The roller cage 18 is formed from a comparatively thick solid ring having an axial dimension that is somewhat less than the diameter of the rollers 19, 20 and which has a large number of radial bores 24 drilled in from its peripheral surface at a circumferential spacing as close as can be achieved without the bores actually breaking into one another. These bores 24 constitute open-ended pockets to receive the rollers; being of substantially the same diameter as the rollers they each break through the two flat radial side faces of the cage ring, with the rollers protruding through the breaks. The bores 24 do not, however, break through the inner circumferential face of the cage ring but each is closed at its bottom end 25. Each of the bores 24 receives two rollers 19, 20 disposed end to end, the combined axial length of the two rollers being substantially equal to the length of the bore. One roller 19 of each pair is slightly longer than the other roller 20, and the rollers are arranged so that the break lines 26 where the roller ends meet are staggered from one bore to the next; that is to say in alternate bores the longer roller 19 is at the inner end of the bore, as shown in the drawing, while in the remaining intermediate bores the shorter roller 20 is at the inner end.

It has been found that the technique described above for forming the roller cage considerably increases the number of rollers that can be accumulated in a cage of a given diameter, as compared with conventional roller cages. Indeed, practically as many roller pairs 19, 20 can be set around the cage circumference as could be packed in if the cage were not present at all. The rollers are retained in their bores 24 by the hoop 21 which encircles the cage 18. Both the cage 18 and the hoop 21 are of manganese bronze or some similar bearing alloy.

The inner thrust face of the bearing is provided by the thrust washer 22 which is interposed between the thrust race 12 and the rollers 19, 20. The outer thrust race is provided by the ring 23 of robust cross-section, which can also be of steel.

In order to facilitate assembly and dismantling of the bearing the thrust washer 22, the cage ring 18 and the outer race 23 are each split on a diameter. The two halves of each of these split components are held together as follows. In the case of the thrust washer 22 the hoop 21, which is not split but forms a continuous encircling band, is extended axially to overlie the peripheral surface of the washer, as at 27. The cage ring 18 is formed, just radially inward of the rollers, with an axially projecting shoulder 28 that is encircled by an inner cylinder surface 29 of the outer thrust race 23. The outer race 23 not only by this means holds together the two halves of the cage ring but it also abuts a side edge of the hoop 21 to prevent the hoop shifting axially and releasing the halves of the thrust washer 22. The outer race 23 in its turn has a shoulder 30 that is encircled by a ring surface 31 on the propeller boss whereby all the parts are held captive in assembly. Although the hoop 21 has a smaller internal diameter than both the inner thrust race 12 and the blade root 13, it is quite flexible and can easily be squeezed by hand into an ellipse for slipping sideways over the blade root.

The interposition of the split washer 22 between the rollers 19, 20 and the inner thrust race 12 results in the inner thrust race being relieved of local pressure loading and the hoop stresses which otherwise would be produced by the transfer of axial thrust from the rollers 19, 20 direct to the thrust race 12. As no direct wear or fatigue is therefore experienced by the race 12 there is normally no reason to renew this element in use the bearing being serviced by renewal of the washer 22 and any other of the readily removable parts that become worn.

It is found that provision of a slight relieving chamfer at the splits of the washer 22 is beneficial in reducing the load on each roller at the instant of its passing over the split and thereby extending the life of the bearing.

There is thus provided a propeller blade bearing which is well adapted to its task and which can be readily dismantled and re-assembled in service.

I claim:

1. A roller bearing to take axial thrust at a situation where an inner member of a relatively rotating pair of members undergoes an enlargement in cross section on emerging from the bearing, comprising a roller cage and rollers received therein, said roller cage being formed of a solid ring which has around its circumference a plurality of closely-spaced radial bores receiving said rollers and of a diameter corresponding to that of the rollers, said bores being formed in an annular portion of said cage ring that has a width in the axial direction somewhat less than the roller diameter whereby the bores break through the radial side faces of the ring, the bores extending in from an outer circumferential surface of the ring but not so far as to break through an inner circumferential surface thereof, a retaining hoop encircling the cage and retaining the rollers in the bores, an inner thrust race of heat-treatable metal next the aforesaid enlargement, which inner thrust race is shaped to fit contiguously against a flaring surface of the enlargement and is a non-renewable part of said inner member and presents a flat radial thrust face toward said roller cage, and a diametrically-split renewable thrust washer of bearing metal different from the heat-treatable metal of said inner thrust race and interposed between the bearing rollers and said flat radial thrust face of said inner thrust race.

2. A bearing according to claim 1 wherein the two halves of the split thrust washer are held together by an axial extension of the retaining hoop encircling the roller cage.

3. A bearing according to claim 1 wherein the roller cage is diametrically split and has an axially-projecting shoulder that is encircled by an axially extending surface on an outer thrust race.

4. A bearing according to claim 2, wherein the outer thrust race is also diametrically split and has an axially-projecting shoulder that is encircled by a ring surface on the outer member of the relatively-rotating pair.

5. A bearing according to claim 1, wherein the roller-engaging face of the split thrust washer has relieving chamfers at the splits.

6. A bearing according to claim 1, wherein each bore in the roller cage contains two rollers of different lengths placed end to end, the longer roller being at the inner end of the bore in alternate bores and the shorter roller in the intermediate bores.

References Cited

UNITED STATES PATENTS

| 2,117,633 | 5/1938 | Smith | 308—235 |
| 2,248,590 | 7/1941 | Smith | 29—149.5 |
| 1,373,929 | 4/1921 | Wisdom | 308—234 |

FOREIGN PATENTS

| 815,927 | 4/1937 | France. |
| 573,447 | 11/1945 | Great Britain. |
| 151,705 | 9/1920 | Great Britain. |

MARTIN P. SCHWADRON, *Primary Examiner.*

FRANK SUSKO, *Examiner.*